United States Patent
Hoy et al.

[11] 3,881,857
[45] May 6, 1975

[54] COMBUSTOR

[75] Inventors: Herbert Raymond Hoy, Leatherhead; Alan Gregson Roberts, Dorking; Dennis Malcolm Wilkins, Chipstead, all of England

[73] Assignee: BP Trading Limited, London, England

[22] Filed: Mar. 6, 1974

[21] Appl. No.: 448,489

[30] Foreign Application Priority Data
Mar. 20, 1973  United Kingdom............... 13283/73

[52] U.S. Cl..................... 431/7; 34/57 A; 110/28 J; 431/170; 432/58
[51] Int. Cl............................................ F23d 19/02
[58] Field of Search ....... 431/7, 170, 328; 110/28 J; 432/58; 34/57 A

[56] References Cited
UNITED STATES PATENTS
3,277,582  10/1966  Munro et al....................... 34/57 A
3,309,784  3/1967  Adams............................... 34/57 A
3,617,224  11/1971  Garibaldi et al................ 34/57 A X

*Primary Examiner*—Edward G. Favors
*Attorney, Agent, or Firm*—Morgan, Finnegan, Durham & Pine

[57] ABSTRACT

A distributor plate suitable for use in a fluidised bed furnace or gasifier comprises a chamber with fuel gas and oil inlets and a number of vertical air tubes passing through the chamber. The interior of the air tubes communicate with the chamber, and the upper end of the air tubes have outlet heads that supplied combustible mixtures to the fluidised bed. The chamber is divided into zones having increasing numbers of air tubes per zone so that progressively increasing areas of the distributor plate may be ignited during start up of a fluidised bed furnace.

13 Claims, 2 Drawing Figures

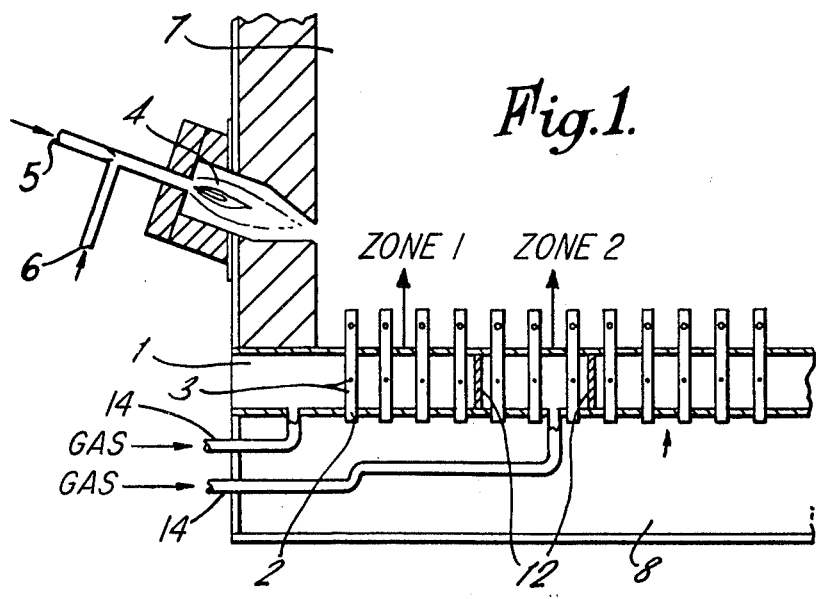
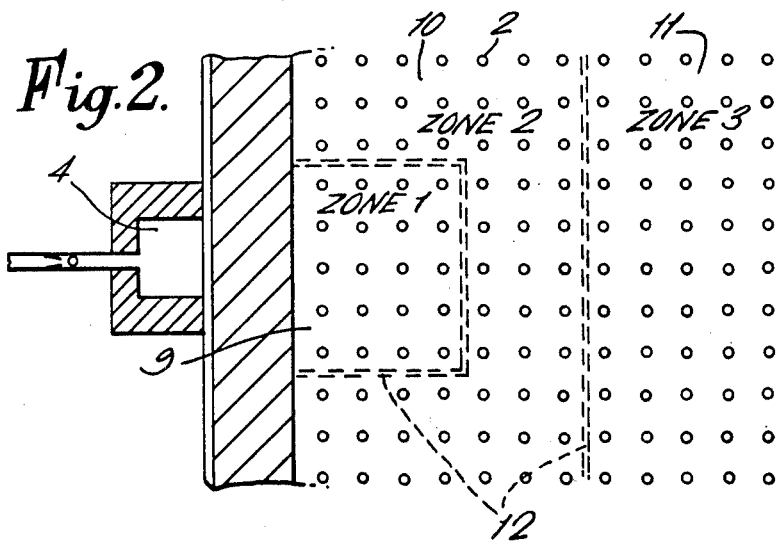

COMBUSTOR

This invention relates to fluidised combustion and in particular to the ignition of fluidised combustion furnaces.

Prior to the burning of coal or oil in a fluidised bed furnace, it is required to raise the bed material to the ignition temperature. This may be achieved, for example, by pre-mixing fuel gas with the fluidising air. A suitable method of igniting such a fluidised bed furnace is described in British Pat. No. 1,159,310.

Usually this lighting procedure is suitable when the bed in the furnace is of relatively small volume (e.g., less than 20 ft$^3$). However with beds of a large cross section or depth, the potential energy (in the form of a fuel gas/air mixture) capable of being stored in the bed is sufficient to make this a hazardous procedure with the possibility of explosions occurring. This is particularly the case in pressurised or supercharged fluidised bed furnaces which inherently have deep beds (e.g., 10 to 15 ft) and where temperature or pressures surges may damage, for example, associated gas turbine and dust cleaning equipment.

According to the invention there is provided a distributor plate suitable for use in a fluidised bed furnace, which distributor plate comprises a chamber having fuel gas inlets and a plurality of air tubes passing through the chamber, the interior of the air tubes being in communication with the chamber, one end of the air tubes terminating in heads having outlets adapted to supply a combustible mixture to a fluidised bed furnace, the chamber also having dividing means adapted to allow fuel gas to be supplied to a progressively increasing number of air tubes, and ignition means substantially adjacent to the plate adapted to ignite the fuel gas.

The distributor plate is intended to form part of a fluidised bed furnace, the fluidised bed lying above the plate.

Preferably the means of ignition is an auxiliary burner, most preferably having a spark igniter. The auxiliary burners may be set into the walls of the furnace. Preferably the burner axis is inclined downwards, most preferably at an angle of 20°–30° to the horizontal so as to minimise the infiltration of bed material into the burner when the latter is not operational.

The chamber is sub-divided so that fuel gas can be admitted to successively larger areas of the bed. The sub-division is achieved preferably by means of division plates fixed in the chamber.

The fluidised bed itself comprises mineral particles of a size range and bulk density appropriate to the velocity of the fluidising gas. Suitable materials include sand, dolomite and limestone.

The outlet heads of the air tubes can be of any suitable shape. The area of the heads should be designed to give good distribution of fuel and air. The particular design will be dependent upon the individual characteristics of the solid being fluidised.

The air tube density can be varied to suit particular circumstances and process requirements. Preferably, there is an air tube density of 10–30 tubes per square foot and each air tube is 6–12 inches long. The total cross-sectional area of the outlets of the tube heads is preferably 1½–3 percent of the total area of the plate.

The outlets of the tube heads preferably form passageways through the side of the air tube, the direction of the passageways being substantially perpendicular to the wall of the air tube.

According to a further feature of the invention there is provided a method of igniting a fluidised bed combustion furnace or fluidised bed gasifier wherein (i) a fluidising gas containing oxygen is passed into a fluidised bed in a furnace or gasifier through the tubes of a distributor plate, (ii) fuel gas is passed into a predetermined fraction or zone of the tubes, the resultant combustible fuel gas/air mixture being ignited and (iii) the number or zones of tubes carrying fuel gas being sequentially increased and ignited.

The invention will now be described by way of example with reference to the drawings accompanying the Specification.

FIG. 1 shows a vertical section through a distributor plate having a division plate.

FIG. 2 shows a cut-away section of the distributor plate illustrating zoning of fuel gas supply.

The fluidised bed furnace comprises a plenum chamber, a distributor plate and a fluidised bed of suitable material e.g., sand.

The plate comprises a gas and chamber 1 and air tubes 2. The air tubes 2 have apertures 3 that communicate with the gas and chamber.

Above the air tubes 2 are arranged one or more auxiliary gas burners 4 fitted in the bed walls. These auxiliary burners may be of any suitable design with separate air 5 and gas supplies 6, ignition means (e.g., spark igniter) and flame failure detection equipment. The burners 4 are adapted to that hot gases are directed at high velocities (e.g., 200–800 ft/sec) downwards from an outlet into the bed 7. The high exit velocity of hot gases from the burner 4 helps to sweep out any bed material residing in the burner 4.

The gas chamber 1 under the distributor plate is sub-divided with dividing plates 12 so as to allow fuel gas to be admitted through conduits 14 to successively larger areas of the bed 7, (FIG. 2), for example in the ratio 1:2:4:8.

As a preliminary to using the fluidised bed furnace the start-up procedure is as follows. Sufficient air is passed from the plenum chamber 8 through the air tubes 2 so as to fluidise the bed material. (The plenum chamber 8 may itself be sub-divided into compartments for load control purposes and one or more compartments may be fluidised at this stage).

The auxiliary gas burners 4 are then ignited and adjusted to operate at near stoichiometric combustion. At this stage the upper surface of the bed may be below the level of the auxiliary gas burners 4, in which case the burner flame may spread several square feet over the bed surface. This situation could arise after a shutdown period when the bed 7 has been emptied. Alternatively the outlets of the auxiliary burners may lie several feet below the bed surface in which case the hot burner gas would penetrate only a few inches into the bed 7. This situation could arise after a normal shutdown.

Following ignition of the auxiliary burner 4, fuel gas from the distributor plate is admitted to a first zone 9 of the bed which corresponds with that portion of the bed 7 subject to impingement of the auxiliary burner flame 4. When this local bed temperature has risen to about 500°C, more fuel gas from the distributor plate is admitted to a second adjacent zone 10 of the bed. This process is repeated until fuel gas from the distributor plate is being admitted over the whole bed area and the temperature is about 800°C. At this point the furnace is then ready to accept the main fuel supply, the auxiliary burners 4 being shut down when combustion of the main fuel is established. The main fuel supply may be fuel oil, coal or other suitable fuel, which may be introduced into the furnace in any suitable manner, as is known by those skilled in the art.

During the early stages of admitting fuel gas from the distributor plate, particularly when the temperature is below 600°C, some of the fuel gas may pass through the bed in an unburned state. As a safeguard, an auxiliary burner or burners (not shown in FIGS. 1 or 2) with its own air and fuel supply is arranged to fire across the top of the bed so as to burn any gas escaping from the bed.

We claim:

1. A distributor plate for igniting a fluidized bed furnace comprising: a chamber having fuel gas inlets; a plurality of air tubes passing through the chamber, the interior of the air tubes being in communication with the chamber by means of holes, one end of the air tubes terminating in heads having outlets; dividing means in the chamber adapted to allow fuel gas to be supplied to a progressively increasing number of air tubes and fuel gas ignition means substantially adjacent to the plate.

2. A distributor plate according to claim 1 in which the dividing means comprise division plates fixed so as to sub-divide the chamber.

3. A distributor plate according to claim 1 in which the fuel gas ignition means is an auxiliary burner.

4. A distributor plate according to claim 3 in which the auxiliary burner has a spark igniter.

5. A distributor plate according to claim 1 in which the outlets form passageways through the side of the air tube, the direction of the passageways being substantially perpendicular to the wall of the air tube.

6. A distributor plate according to claim 1 in which the total cross-sectional area of the outlets of the tube heads is from 1½ to 3 percent of the area of the plate.

7. A distributor plate according to claim 1 in which the air tube density is 10–30 tubes per square foot.

8. A distributor plate according to claim 1 in which the air tubes are 6 to 12 inches long.

9. A device according to claim 3 wherein the auxiliary burner is set into the walls of said furnace.

10. In a fluidized bed furnace, a distributor plate comprising: a chamber having fuel gas inlets; a plurality of air tubes passing through the chamber and having a density in the range of 10–30 tubes per square foot, the interior of the air tubes being in communication with the chamber through passageways therein, said passageways being substantially perpendicular to the wall of the tubes, one end of the air tubes terminating in heads having outlets, said outlets forming 1-½ to 3 percent of the area of the plate; division plates fixed within said chamber and adapted to allow fuel gas to be supplied to a progressively increasing number of air tubes; and fuel gas auxiliary burner substantially adjacent to the plate.

11. A fluidised bed furnace according to claim 10 in which the burner axis is inclined downwards.

12. A fluidised bed furnace according to claim 11 in which the burner axis is at an angle of 20°–30° to the horizontal.

13. A method of igniting a fluidized bed combustion furnace or fluidized bed gasifier comprising passing a fluidizing gas containing oxygen into a fluidized bed in a furnace or gasifier through the air tubes of a distributor plate, passing fuel gas into a predetermined fraction or zone of the tubes and igniting the resultant combustible fuel gas/air mixture; and, sequentially increasing the number or zones of tubes carrying fuel gas and igniting the gas therein.

* * * * *